(12) United States Patent
Li

(10) Patent No.: US 11,582,136 B2
(45) Date of Patent: Feb. 14, 2023

(54) GEOGRAPHIC ROUTING MESH NETWORK

(71) Applicant: Rapyuta Robotics Co., Ltd., Tokyo (JP)

(72) Inventor: Wen Zheng Li, Tokyo (JP)

(73) Assignee: Rapyuta Robotics Co., Ltd., Tokyo (JP)

( * ) Notice: Subject to any disclaimer, the term of this patent is extended or adjusted under 35 U.S.C. 154(b) by 0 days.

(21) Appl. No.: 17/379,981

(22) Filed: Jul. 19, 2021

(65) Prior Publication Data

US 2023/0013258 A1   Jan. 19, 2023

(51) Int. Cl.
*H04L 45/02* (2022.01)
*H04L 45/12* (2022.01)
*H04L 67/12* (2022.01)

(52) U.S. Cl.
CPC ............ *H04L 45/02* (2013.01); *H04L 45/126* (2013.01); *H04L 67/12* (2013.01)

(58) Field of Classification Search
CPC ........ H04L 45/02; H04L 45/126; H04L 67/12
See application file for complete search history.

(56) References Cited

U.S. PATENT DOCUMENTS

| | | | | |
|---|---|---|---|---|
| 7,006,453 B1 * | 2/2006 | Ahmed | ................... | H04L 45/02 370/255 |
| 7,626,966 B1 * | 12/2009 | Ruiter | ............... | H04M 1/72513 370/310 |
| 8,665,841 B1 * | 3/2014 | Goel | ....................... | H04L 45/26 370/327 |
| 8,787,330 B2 * | 7/2014 | Goel | ..................... | H04W 40/24 370/332 |
| 9,042,267 B2 * | 5/2015 | Bill | ........................ | H04W 4/023 370/254 |
| 10,440,631 B1 * | 10/2019 | Joshi | ..................... | H04W 40/28 |
| 10,484,925 B1 * | 11/2019 | Chen | ..................... | H04W 40/16 |

(Continued)

FOREIGN PATENT DOCUMENTS

| | | |
|---|---|---|
| EP | 11341940 A1 | 9/2001 |
| JP | 2008271535 A | 11/2008 |
| JP | 2008278148 A | 11/2008 |

OTHER PUBLICATIONS

European Search Opinion and Search Report dated Feb. 8, 2022, in the European Application No. 21192133.3.

(Continued)

*Primary Examiner* — Jimmy H Tran
(74) *Attorney, Agent, or Firm* — Trupti P. Joshi

(57) ABSTRACT

The disclosure relates to method and system for geographic routing mesh network. The method may include determining, by a first node, a first list of nodes proximal to the first node in a mesh network. The method further includes sending, by the first node to each node on the first list of nodes, the first list of nodes proximal to the first node. The method(s) further includes receiving, by the first node in response to sending the first list of nodes, one or more second list of nodes from one or more nodes of the first list of nodes, each of the one or more second list of nodes being proximal to one of the one or more nodes of the first list of nodes and updating, by the first node in response to receiving one or more second list of nodes proximal to the one more nodes of the first list of nodes, one or more nodes of the first list of nodes.

20 Claims, 6 Drawing Sheets

(56) References Cited

U.S. PATENT DOCUMENTS

| | | | |
|---|---|---|---|
| 10,588,069 B1* | 3/2020 | Chen | H04L 45/26 |
| 10,979,885 B1* | 4/2021 | Shukla | H04W 40/246 |
| 11,070,467 B1* | 7/2021 | Shukla | H04W 8/005 |
| 11,438,823 B2* | 9/2022 | Ashwood-Smith | H04W 40/248 |
| 2008/0240050 A1 | 10/2008 | Pun | |
| 2009/0052463 A1* | 2/2009 | Chen | H04W 72/1236 370/406 |
| 2009/0310516 A1* | 12/2009 | Goel | H04W 74/0808 370/254 |
| 2010/0208739 A1* | 8/2010 | Ofri | H04L 45/124 370/400 |
| 2010/0278118 A1* | 11/2010 | Gossain | H04W 40/02 370/329 |
| 2011/0228736 A1* | 9/2011 | Zhao | H04W 16/10 370/329 |
| 2012/0147783 A1* | 6/2012 | Shaffer | H04W 4/50 370/254 |
| 2012/0320768 A1* | 12/2012 | Shaffer | H04W 40/16 370/252 |
| 2012/0320790 A1* | 12/2012 | Shaffer | H04W 40/28 370/254 |
| 2013/0121337 A1* | 5/2013 | Nguyen | H04L 45/70 370/410 |
| 2013/0170394 A1* | 7/2013 | Bill | H04L 67/306 370/254 |
| 2015/0181500 A1* | 6/2015 | Mainaud | H04L 43/0823 370/252 |
| 2015/0334631 A1* | 11/2015 | Patil | H04W 12/50 380/270 |
| 2016/0020979 A1* | 1/2016 | Thubert | H04L 43/062 370/252 |
| 2018/0331914 A1* | 11/2018 | Yoshida | H04W 8/005 |
| 2019/0053133 A1* | 2/2019 | Abouelseoud | H04W 48/16 |
| 2020/0077326 A1* | 3/2020 | Abouelseoud | H04W 40/244 |
| 2020/0287834 A1* | 9/2020 | Ramanathan | H04W 28/0289 |
| 2021/0194808 A1* | 6/2021 | McCormick | H04W 84/18 |
| 2021/0377151 A1* | 12/2021 | Halabian | H04L 45/126 |
| 2021/0377841 A1* | 12/2021 | Ashwood-Smith | H04W 40/38 |
| 2022/0190913 A1* | 6/2022 | Akhavain Mohammadi | H04B 7/18584 |
| 2022/0247487 A1* | 8/2022 | Akhavain Mohammadi | H04B 7/18519 |
| 2022/0255846 A1* | 8/2022 | Ross | H04L 41/0816 |

OTHER PUBLICATIONS

Mo Li et al: "Underground coal mine monitoring with wireless sensor networks", ACM Transactions On Sensor Networks, ACM, 2 Penn Plaza, Suite 701 New York NY 10121-0701 USA, vol. 5, No. 2, Apr. 3, 2009 (Apr. 3, 2009), pp. 1-29, XP058346979, ISSN: 1550-4859, DOI: 10.1145/1498915.1498916 * section 4 *.

* cited by examiner

GEOGRAPHIC ROUTING MESH NETWORK

TECHNICAL FIELD

The disclosure herein generally relates to mesh network, more particularly, to geographic routing mesh network.

BACKGROUND

Geographic routing, also known as geo-routing or position-based routing is a routing principle that relies on geographic position information. Geographic routing requires that each node can determine its own location and that the source is aware of the location of the destination. With this information, a message can be routed to the destination without knowledge of the network topology or a prior route discovery. In the field of routing methodologies, IP routing involves the determination of a suitable path for a network packet from a source to its destination in an IP network with centralized authority. The process uses static configuration rules or dynamically obtained status information to select specific packet forwarding methods. Creation and maintenance of the network topology takes different approaches for centralized configuration by creating, delegating, merging and splitting as load on the network fluctuates.

SUMMARY OF THE INVENTION

The accompanying drawings, which are incorporated in and constitute a part of this disclosure, illustrate exemplary embodiments and, together with the description, serve to explain the disclosed principles:

Embodiments of the present disclosure present technological improvements as solutions to one or more of the above-mentioned technical problems recognized by the inventors in conventional systems. For example, in one embodiment, a processor implemented method for geographic routing mesh network is provided. The method includes determining, by a first node, a first list of nodes proximal to the first node in a mesh network. The determining the first list of nodes proximal to the first node includes computing distance between the first node and one or more nodes in a geometric space. The method further includes sending, by the first node to each node on the first list of nodes, the first list of nodes proximal to the first node. The method further includes receiving, by the first node in response to sending the first list of nodes, one or more second list of nodes from one or more nodes of the first list of nodes, each of the one or more second list of nodes being proximal to one of the one or more nodes of the first list of nodes. The method further includes updating, by the first node in response to receiving one or more second list of nodes proximal to the one more node of the first list of nodes, one or more nodes of the first list of nodes. The updating the one or more nodes of the first list of nodes includes re-computing distance between the first node and the first list of nodes proximal to the first node based on information associated with one or more second list of nodes proximal to the one more nodes of the first list of nodes.

In another embodiment, a system for geographic routing mesh network is provided. The system includes a memory storing instructions, and one or more hardware processors coupled to the memory via the one or more communication interfaces. The one or more hardware processors are configured by the instructions to determine by a first node, a first list of nodes proximal to the first node in a mesh network. The determining the first list of nodes proximal to the first node includes computing distance between the first node and one or more nodes in a geometric space. The system is further configured to send, by the first node to each node on the first list of nodes, the first list of nodes proximal to the first node. The system is further configured to receive by the first node in response to sending the first list of nodes, one or more second list of nodes from one or more nodes of the first list of nodes, each of the one or more second list of nodes being proximal to one of the one or more nodes of the first list of nodes. The system is further configured to update, by the first node in response to receiving one or more second list of nodes proximal to the one more node of the first list of nodes, one or more nodes of the first list of nodes. The updating the one or more nodes of the first list of nodes includes re-computing distance between the first node and the first list of nodes proximal to the first node based on information associated with one or more second list of nodes proximal to the one more nodes of the first list of nodes.

In yet another embodiment, one or more non-transitory machine readable information storage mediums are provided. Said one or more non-transitory machine readable information storage mediums comprises one or more instructions which when executed by one or more hardware processors causes determining, by a first node, a first list of nodes proximal to the first node in a mesh network. The determining the first list of nodes proximal to the first node includes computing distance between the first node and one or more nodes in a geometric space. The method further includes sending, by the first node to each node on the first list of nodes, the first list of nodes proximal to the first node. The method further includes receiving, by the first node in response to sending the first list of nodes, one or more second list of nodes from one or more nodes of the first list of nodes, each of the one or more second list of nodes being proximal to one of the one or more nodes of the first list of nodes. The method further includes updating, by the first node in response to receiving one or more second list of nodes proximal to the one more node of the first list of nodes, one or more nodes of the first list of nodes. The updating the one or more nodes of the first list of nodes includes re-computing distance between the first node and the first list of nodes proximal to the first node based on information associated with one or more second list of nodes proximal to the one more nodes of the first list of nodes.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
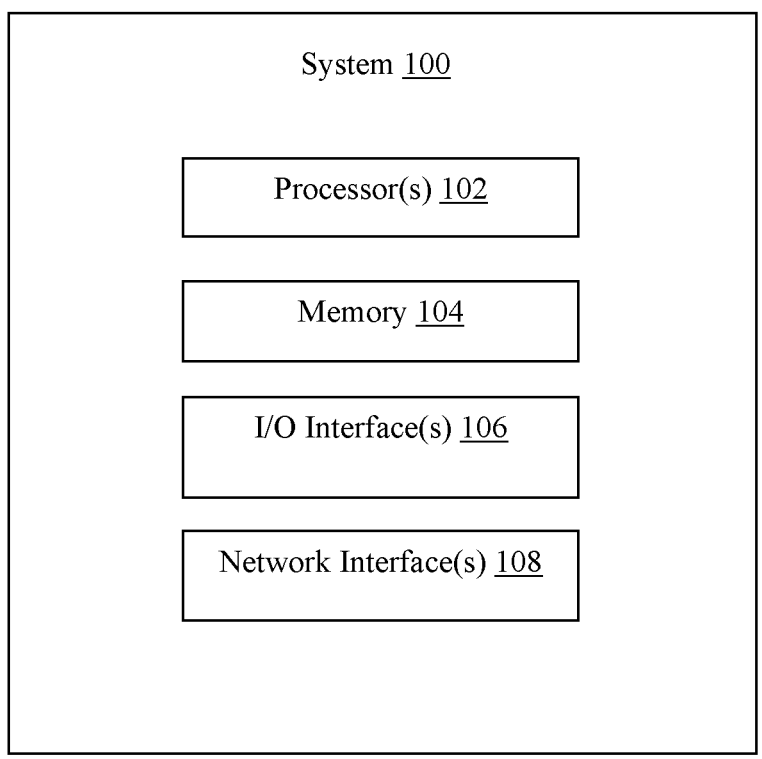
FIG. 1 illustrates an example of a general system that may communicate with other similar systems within a local environment, in accordance with some embodiments of the present disclosure.

Exemplary embodiments are described with reference to the accompanying drawings. In the figures, the leftmost digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the claims (when included in the specification).

Embodiments of techniques to build and maintain a mesh network and a simulation model using a device and software service store are described herein. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily referring to the same embodiment. Furthermore, the particular features, structures, or characteristics may be combined in any suitable manner in one or more embodiments.

Typically, a mesh network is a local network topology in which the infrastructure nodes (i.e. bridges, switches, and other infrastructure devices) connect directly, dynamically and non-hierarchically to as many other nodes as possible and cooperate with one another to efficiently route data from/to source. In general, mesh networks may dynamically self-organize and self-configure, which can reduce installation overhead. The ability to self-configure enables dynamic distribution of workloads, particularly in the event of failure of a few nodes. This in turn contributes to fault-tolerance and reduced maintenance costs. On the other hand, in case of wireless radios mesh networks, a physical range limitation arises due to the nature of radio propagation, versus a system designed to run on top of IP/internet where the assumption is that anything can connect to anything else given the correct IP address. Because of this, different approaches need to be taken in order to ensure connectivity and minimize latency because there is more freedom to form long range connections and other limitations that are otherwise not present. The discovery and network maintenance protocol is also vastly different in these two networks. With wireless radios, every node just scans for whoever else is in range, and that fully determines the neighbor sets and topology of the network connections. Then the job of a routing algorithm is to perform robustly despite various connection topologies. Also there's no mechanism to just directly scan for neighbors like a radio, because everything on the internet is potentially a neighbor and there's too many to keep track of even to weed out and compare who is the closest neighbor to establish a contact.

Various embodiments of the present disclosure provide system(s) and method(s) for geographic routing mesh network to overcome the above deficiencies. In other words, the present disclosure proposes an adaptive and self-maintaining mesh overlay network. Each node in the mesh network in accordance with the present disclosure, continuously discovers and maintains direct connections/associations to a limited number of peers in nearby proximity defined by geometric space. The present disclosure provides modeling radial propagation of information (messages) from a point source, with QoS inversely proportional to hop distance. Herein messages are routed through the network via neighbor to neighbor hops. Also, flooding of messages is limited by the range and time bounds of messages. The present disclosure also provides a method and system to build and maintain a network topology designed to optimize routing of messages, since in a system designed to run on top of IP/internet, anything can connect to anything else. The present disclosure also provides a discovery mechanism based on proximal neighbor-list exchanges in a direct P2P (Peer-to-peer) manner. Peer-to-Peer (P2P) proximity communication may use information related to proximity of one or more peers in order to communicate information for applications or services in an infrastructure-free configuration. The P2P proximity communication may be implemented using a fully distributed system without a central controller. The term peer may refer to a user, a user device, and/or multiple devices associated with a given user. Examples of P2P devices may include, smart phones, tablets, laptops, game consoles, set-top boxes, cameras, printers, sensors, home gateways, robots, medical devices and/or the like.

Embodiments of the present disclosure provide a decentralized architecture of the mesh network. In the decentralized architecture communication between nodes is symmetrical in function and does not require maintenance of a central coordinating infrastructure The decentralized architecture/infrastructure free of the mesh network facilitates minimal communication latency between nodes of neighboring proximity and efficient neighbor search as each node is directly connected (i.e., zero hops) to neighbor nodes. In the decentralized architecture, mesh topology maintains direct connections to proximity peers and dynamically adjusts to changes in the local mesh environment by considering message/data shared by direct neighbors. Further, the architecture is scalable to an infinite number of nodes due to a constant average connection degree maintained between nodes. Embodiments of the present disclosure also provide a method for distributed synchronization between nodes. In one embodiment, synchronization/consensus of shared states or entities allows distribution of work and computation over geometric spaces and natural topology around a local region.

Embodiments of the present disclosure describe a system and method for geographic routing mesh network. The present disclosure describes peer-to-peer (P2P) geographic routing mesh for synchronization in spatially distributed computing. In accordance with present disclosure, nodes form an adaptive self-maintaining mesh overlay network where each node continuously discovers and maintains direct connections to a predefined number of peers in nearby proximity defined by geometric space. Further, neighbor nodes are continuously updated and broadcast information about local neighborhoods in order to facilitate network discovery and maintenance of mesh network topology.

A detailed description of the above described system and method for geographic routing mesh network is shown with respect to illustrations represented with reference to FIGS. 1 through 6.

Exemplary embodiments are described with reference to the accompanying drawings. In the figures, the leftmost digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 illustrates an example of a general system that may communicate with other similar systems within a local environment, in accordance with some embodiments of the present disclosure. The system 100 includes or is otherwise in communication with at least one processor such as a processor(s) 102, at least one memory such as a memory 104, and an I/O interface(s) 106 and a network interface(s) 108. Although FIG. 1 shows example components of system 102, in other implementations, system 102 may contain fewer components, additional components, different components, or differently arranged components. In an embodiment, the system 102 may be a device or data point in a larger network, for example, a node. The node may be a device, which may include, but not limited to a PC, phone, or printer. In another embodiment, a node may be a connection point, a redistribution point, or a communication endpoint.

The at least one processor(s) such as the processor 102 may be implemented as one or more microprocessors, microcomputers, microcontrollers, digital signal processors, central processing units, state machines, logic circuitries, and/or any devices that facilitate in managing access to neighboring nodes Further, the processor 102 may comprise a multi-core architecture. Among other capabilities, the processor 102 is configured to fetch and execute computer-readable instructions or modules stored in the memory 104, for example simulation modules, neighbor node information, instruction from neighbor nodes and the like. The processor 102 may include circuitry implementing, among others, audio and logic functions associated with the communication. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like. The processor 102 may support one or more of a variety of different device functionalities. As such, the processor 102 may include one or more processors configured and programmed to carry out and/or cause to be carried out one or more of the functionalities described herein.

In one embodiment, the processor 102 may include general-purpose processors carrying out computer code stored in local memory (e.g., flash memory, hard drive, random access memory), special-purpose processors or application-specific integrated circuits, combinations thereof, and/or using other types of hardware/firmware/software processing platforms. Further, the processor 102 may be implemented as localized versions or counterparts of algorithms carried out or governed remotely by central servers or cloud-based systems. By way of example, the processor 102 may detect a location of a peer within a local environment, determining the proximity of a node based on the information received by a neighboring node, re-computing the list of neighboring node in response to the messages received, propagating messages sent and received by the proximal nodes, deleting stale, older and non-relevant nodes and the like. In one embodiment, this detection may be performed by a simulation engine with components specific to an application, for example, a robotic arm or a pick assist robot.

The memory 104, may store any number of pieces of information, and data, used by the system 100 to implement the functions of the system 100. The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Examples of volatile memory may include, but are not limited to volatile random access memory (RAM). The non-volatile memory may additionally or alternatively comprise an electrically erasable programmable read only memory (EEPROM), flash memory, hard drive, or the like. The memory 104 may be configured to store information, data, applications, instructions or the like for enabling the system 100 to carry out various functions in accordance with various example embodiments. Additionally or alternatively, the memory 104 may be configured to store instructions which when executed by the processor 102 causes the system 100 to behave in a manner as described in various embodiments. In an example embodiment, the processor 102 may retrieve information or messages from the memory 104 and/or data repository (not shown in FIG) of the system 102. One or more functionalities of the system 100 and components thereof, is further explained in detail with respect to FIGS. 2-5.

In an embodiment, the I/O interface (s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) 106 can include one or more ports for connecting a number of devices to one another or to another server. For example, one or more devices of the present network may be connected via I/O interface(s) 106 over a wireless network.

In an embodiment, the network interface 108 may include a component that enables the system 100 to communicate between devices, for example, communicate between nodes. In one embodiment, the network interface 108 may communicate using an efficient network layer as part of its Open Systems Interconnection (OSI) model. In one embodiment, network layer, may enable the system 100 to communicate with each other via a wireless mesh network, for example a mesh network formed in accordance with present disclosure. The communication may consist of a node identifier and a port number or maybe a unique node ID. In an embodiment, the network interfaces 108 may provide standardized functions such as passing messages, connecting and disconnecting, etc. As such, the network interface 108 may include a wireless card or some other transceiver connection.

In accordance with present disclosure, a method of formation of a mesh network is disclosed. The mesh network is built based on discovery of the nearest neighbor node or proximity of the neighbor node. The proximity of the neighbor node is based on a neighbor criterion. Herein the neighbor criterion is based on each node knowing who the closest neighbors are by computing the distance between the nodes. In accordance with present disclosure, each node continuously discovers and maintains direct connections to a limited number of peers in nearby proximity defined by geometric space. Embodiments of present disclosure implements routing protocols to discover and connect communication paths between two or more peers. For example, initiation of procedures such as forming a connection, updating a connection, dropping a connection, re-connecting may include one or more peers to update routing paths in order to ensure an appropriate routing path between peers. In an example, a routing update procedure and/or a routing change may include a new connection to be established, for example to find better links due to link failure, to remove one or more bad paths and/or cancel related connections accordingly. Routing protocols may be built using association/connection information. Messages carried by the node are routed through a network, for example, the network interface 106 via neighbor to neighbor hops, modeling radial propagation of information from point source, with Quality of Service (QoS) inversely proportional to hop distance. Formation and maintenance of the mesh network is further described in detail with respect to FIG. 2-5.

Figure 2:
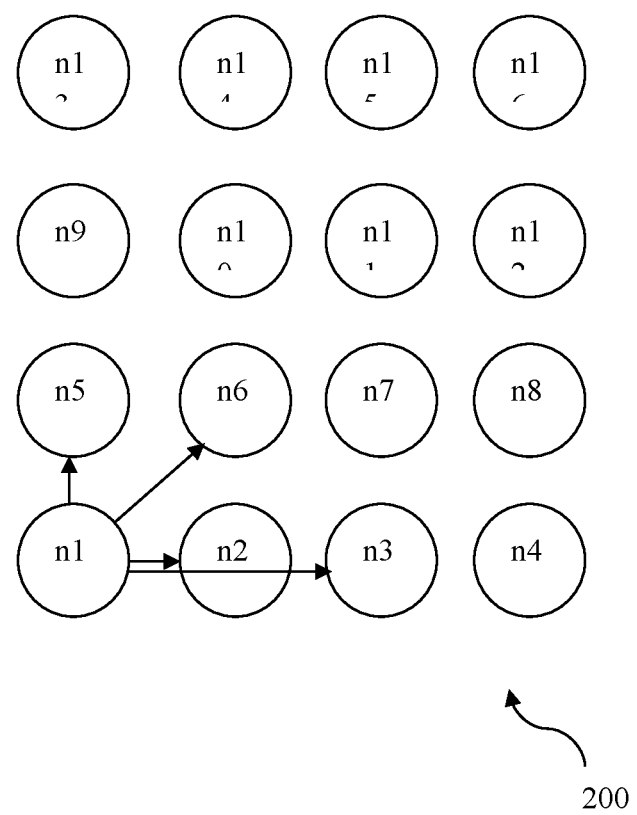
FIG. 2 illustrates formation of a mesh network, in accordance with some embodiments of the present disclosure.

FIG. 2 illustrates formation of a mesh network, in accordance with some embodiments of the present disclosure. In one embodiment, the mesh network is formed with at least one known node in a local region of geographic space. For example, criteria for a node joining a mesh network/forming a connection is to know at least one another node to determine neighbor node/proximal node/closest node in the local region. Herein, knowing a node refers to information associated with a node like node's name, i.e., name of a device, address, i.e., IP address and coordinates of a node in the geographic space. And, the local region of a node refers to the neighborhood of the node in the geographic space within which the node determines the proximal node. As shown in FIG. 2 and in an example embodiment, a plurality of nodes are in a geographic distribution in a 2D space which are not connected, namely, nodes n1, n2, n3 . . . n16. Initially, the nodes n1, n2, n3 . . . n16 are not connected to each other, however each of the nodes include location coordinates in the geographic space. In first step, the nodes n1, n2, n3 . . . n16 knows only first node n1. The first node n1 contains information associated with nodes n2, n3, . . . n16. In the first time stamp, iteration of determining who the closest neighbor node(s) is/are, n1 determines the first list of nodes proximal to the first node based on neighbor criterion. In this time stamp, in response to the information received by the nodes n2, n3 . . . n16, the node n1 determines a first list of nodes proximal to node n1 and forms a connection using one or more aforementioned routing protocol. As shown in FIG. 2, the routing paths are depicted by arrows and nodes by circle. Embodiments of the present disclosure provide a method for determining the neighbor criterion. In one embodiment of determining the neighbor criterion, n1 computes distance between the first node (n1) and one or more nodes in the neighborhood (for example, n2, n3 . . . n16) of the first node in the geometric space. The computed distance of the one or more nodes is transformed to reciprocals by applying inversion spherical transformation, whereby the computed distance is converted to new reciprocal values, and based on the new reciprocal values a convex hull is built. In the convex hull, the new reciprocal values are selected to form a smallest convex polygon enclosing a sphere around the first node, and one or more nodes lying on the sphere is determined as proximal node, for example, as first list of nodes proximal to first node.

As shown in FIG. 2, the first list of nodes proximal to node n1 include n2, n3, n5 and n6 The determined first list of nodes proximal to the first node, is sent to nodes n1, n2, n3 . . . n16. (i.e., since the communication is bidirectional, node n1 responds to node n1, n2, n3 . . . n16 with the first list of nodes proximal to n1) In next time stamp, nodes n2, n3 . . . n16 knows about n1 and the first list of nodes proximal to n1. In response, nodes n2, n3 . . . n16 determines one or more second list of nodes proximal to n2, n3 . . . n16 based on the aforementioned neighbor criteria. In next time stamp, the determined set of one or more second list of nodes proximal to n2, n3 . . . n16 is sent to nodes who contacted with the first list of nodes, thereby propagating information and using the propagated information in successive iterations to form a fully connected mesh network. In one embodiment, communication between the nodes is bidirectional, that is, each node contacted by node n1 responds to node n1 with each node's information/neighbor list. In an alternative embodiment, depending on the application or predetermined criteria, only a certain node may respond to node n1. For example, the predetermined criteria may be to respond to only the source node or original node from the second list of nodes. In another alternative embodiment, some of the nodes may not propagate the information/message based on a predetermined attribute of an application and considers some information to be non-relevant to the application. In another alternative embodiment, a stale node may not be responded to based on time lapse and so on and so forth. In another alternative embodiment, collective vetoing of updates may be directly mapped as refusal to forward a message, as a vote by action by each node. In accordance with present embodiment, the process of determining the list of neighbors is dynamic and iterative thereby forming a fully connected mesh network. At each successive iteration of determining the list of proximal nodes, the best estimate of the neighbor list is generated and a fully connected node is formed.

Figure 3:
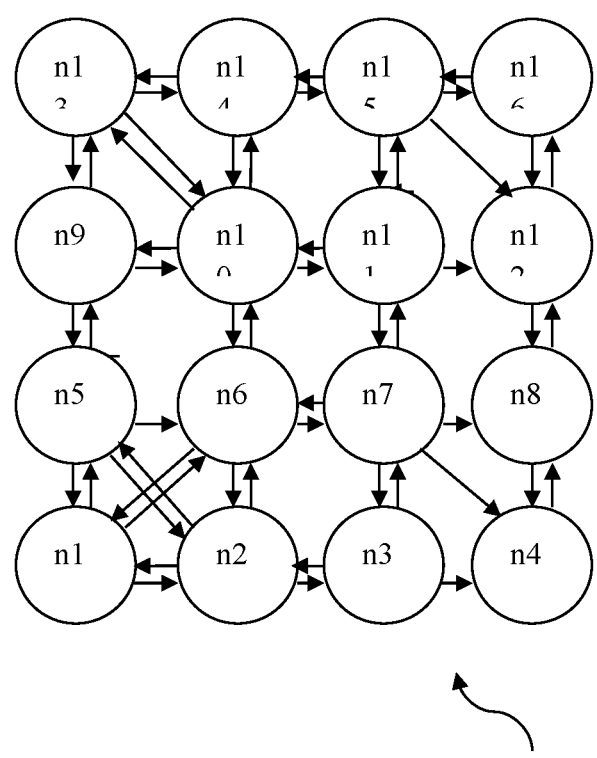
FIG. 3 illustrates a fully connected mesh network, in accordance with some embodiments of the present disclosure.

FIG. 3, illustrates a fully connected mesh network, in accordance with some embodiments of the present disclosure. Embodiments of the present disclosure provide updating the first list of nodes proximal to n1 based on the information propagated. For example, based on the one or more second list of nodes proximal to one or more first list of nodes proximal to node n1, the node n1 re-computes the first list of nodes proximal to the first node n1. The process of re-computing lists of neighbors is iterative. The re-computing of the neighbor list is continued until n1 forms a connection with the neighbors satisfying the neighbor criterion and synchronizing with the neighbor nodes to form a fully connected mesh network or a mesh network topology. In accordance with present disclosure, the fully formed mesh network is a decentralized architecture. In other words, each node in the mesh network is in direct connection with neighbor nodes (zero hops). For example, if anything changes in an environment around a node in the fully connected mesh network, then the node sends a direct message to the node's neighbors' list such that communication between nodes are symmetrical in function without maintenance of central coordinating infrastructure.

In one embodiment, the process of building the mesh network is continuous and iterative such that the built mesh is maintained. Thus building and maintaining the mesh network is simultaneous and continuous. As soon as each node is connected, the connected nodes continuously re-computes the list of neighbor nodes for better information propagation. For example, the synchronization between each of the nodes n1, n2, n3 . . . n16 is further described in detail with respect to FIG. 4 via a simulation engine and simulation integration between nodes in FIG. 5.

Figure 4:
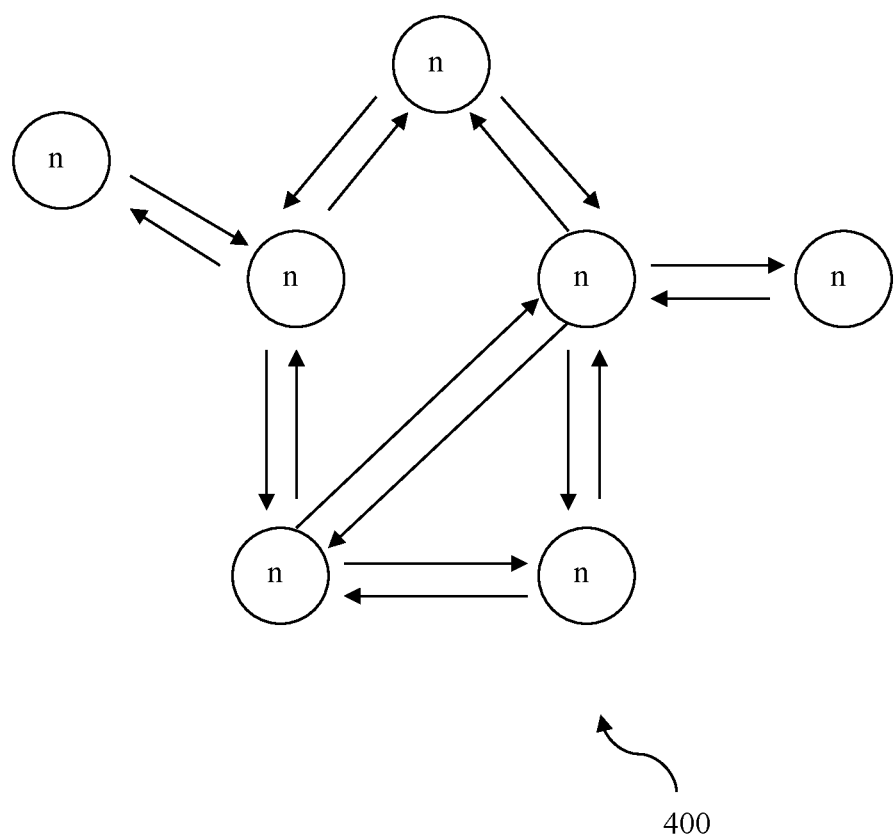
FIG. 4 illustrates synchronization mechanism in a mesh network, in accordance with some embodiments of the present disclosure.

FIG. 4, illustrates synchronization mechanism in a mesh network, in accordance with some embodiments of the present disclosure. In one embodiment, each node of the fully connected mesh network, for example each node from FIG. 3, has control over message filtering and forwarding. The process of filtering and forwarding messages is part of maintaining the mesh network topology. For illustrative purposes part of the connected mesh network topology is shown in polygonal formation. In another embodiment, the mesh network may form a network with linear, start, tree, and/or mesh topology where each pair of peers could potentially communicate with each other directly and/or through. As shown in FIG. 4, node n1 is in direct communication with node n2, n3 and n4. The nodes n2, n3 and n4 are contacted by node n1 and receive the first list of nodes proximal to the first node. In the next time stamp, each of the nodes n2, n3 and n4 responds to node n1 with a second list of nodes proximal to one or more first list of nodes proximal to the first node. Each of the connected, two or more nodes may communicate directly (without the use of a relay or intermediary network) using various communication protocols such as one or more of Bluetooth, WiFi, near-field communications (NFC), and/or other proximity based communication methods. For example, communication may include position of an object within a local environment. In this example, neighbor nodes n2, n3 and n4 may contain information corresponding to the position of the object. In this P2P communication, information related to the position of the object is exchanged between n1, n2, n3 and n5 (direct neighbors). The information related to the position of the object may differ. For example a value associated with the information corresponding to the position of an object for nodes n1, n2, n3 and n5 may be different, each may have a different estimation. The different values associated with the position of the nodes is shared by the neighbors nodes, for example in the form of string or value or text, via communication interface. After receiving information, nodes n1, n2, n3 and n5 perform an averaging process on the value to arrive at a best estimate value in sync with neighbors nodes. In accordance with present disclosure, the averaging process is distributed averaging in which at every time stamp (every cycle of estimating a value) each node gets closer to the best estimate/convergence value. In distributed averaging, information propagation between peers is continuous where the best estimate of each of the nodes is constantly broadcasted and re-broadcasted to the neighbors nodes.

In an example application a robot may be sending information back and forth to connected neighbor robots on the same floor of a warehouse about the position of an object. The robot and each of the neighbor robots may have an estimate of the position of the object stored in device memory of the robot or a database accessed by a robot. Once these robots are connected virtually and information is shared back and forth, the information is averaged in every time stamp until value converges. Thereby, each of the robots is synchronized on the information corresponding to the position of the object. In another example, value associated with each of the updated one or more nodes may be information corresponding to a node, for example, the information may correspond to time clock, position of an object, location of coordinates etc.

In one embodiment, convergence of actual value arises geographically. In other words, nodes in the near proximity agree with each other first and then with the farther node later, travelling from microscopic approach to macroscopic. For example, node n1 in FIG. 4 considers value shared by node n2 and n5 first and then considers value shared by n4, n6 or n7 as and when connection is formed. The distributed averaging mechanism adapts a filtration technique to ignore all updates unless it comes from the neighbor closest in proximity to the origin of the update message. The mechanism follows a proximity authority in the absence of central authority. In one embodiment, if conflicting updates are received from multiple neighbor nodes simultaneously, the local node decides and arbitrates based on user applications or services. For example, a predetermined attribute may be adapted based on the application or service. In this case, resultant averaging is based on predetermined attributes in which messages are filtered relevant to the predetermined attribute. The filtered message is forwarded to remaining neighbors to continue the propagation and iterative refinement process. Embodiments of the present disclosure may also provide selecting a value based on proximity of neighbors nodes. If each of the one or more nodes of the neighbors node is associated with conflicting values, then a value may be chosen which is in sync with the node's proximity or node's local environment. For example, a node may choose one value over the other considering the proximity of the node and/or relevance of the value to an application or service. Once the value is selected, that is for example, value associated with the nearest neighbor node, the information is further propagated to other neighbor nodes.

In one embodiment, each of the nodes in the mesh network simulates the environment in either a 2D (i.e., in circle) or 3D (i.e., sphere). In a 2D example, nodes far away in proximity have no effect on each other and therefore may be in a status of decoupled simulation model. However, when these two nodes come closer in proximity, then each of the nodes directly contact each other and send messages back and forth to synchronize and integrate the simulation model. For example, the simulation model may be embedded in larger applications or services. Simulation integration is further described in detail with reference to FIG. 5.

Figure 5:
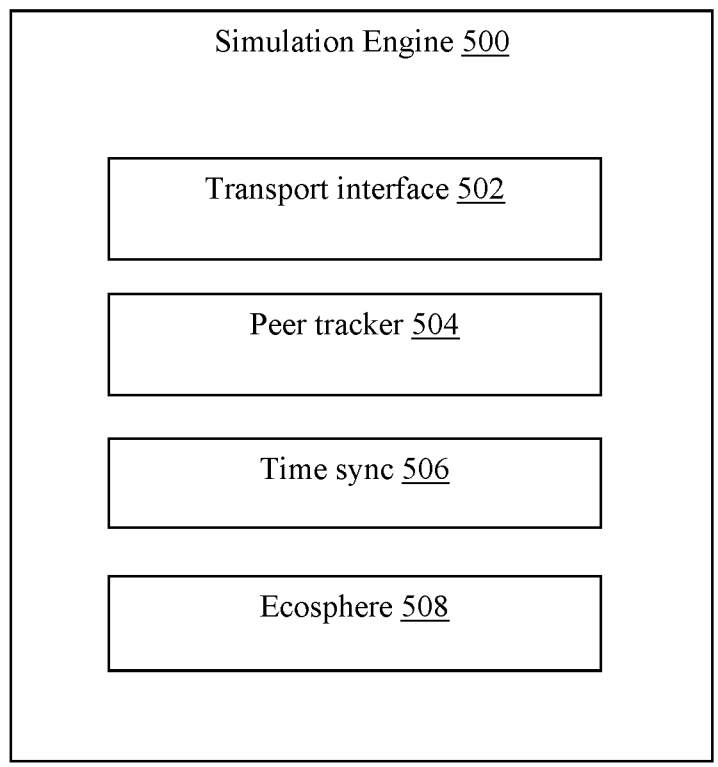
FIG. 5 illustrates a simulation engine for performing an application, in accordance with some embodiments of the present disclosure.

FIG. 5, illustrates a simulation engine for performing an application, in accordance with some embodiments of the present disclosure. Simulation engine 500 is a collection of components, features and support functions which facilitates implementation of a simulation model, for example, in the fully connected mesh network topology. In one embodiment and as shown in FIG. 5, simulation engine 500 includes components, namely, transport interface 502, peer tracker 504, time sync 506 and ecosphere 508. Embodiments of the simulation engine 500 may also include other components (not shown in the FIG. 5). The transport interface 502 is a message delivery service between peers. For example, node n1 to node n2 of FIG. 3 which are in direct contact. The message may include a name and an address from a lower level node to a node in an upper level in a mesh overlay network. The message may be a combination of data and address of a node. In one embodiment, a message may be in the form of a binary blob, a string, or an entity, an event which may be converted to text to/from source node. The transport interface 502 may be a part of the abstraction layer in the mesh overlay network topology. The peer tracker 504 is a tracking mechanism for peers connecting to one another based on proximity in the mesh network. In one embodiment, the peer tracker 504, facilitates formation of the mesh network as well as continuous maintenance of the mesh network. For example, the peer tracker 504 connects peers in the mesh network satisfying predetermined criteria based on an application or service and maintains the mesh network build from the low level based on the predetermined application or service.

In one embodiment, the peer tracker 504 functions include a peer selection test. The peer selection test is performed to determine connection between peers based on proximity. In the process of formation of the mesh network, as the iteration process continues, the proximity list is recomputed at every time stamp and the far away nodes are disconnected. For example, in a polygonal orientation of mesh topology, the formation of each of the five nodes, namely node n1, n2, n3 and n4 (as shown in FIG. 4) is based on the knowing the name, network address and coordinates of each of the node n1, n2, n3 and n4 in geographical space. Based on the information/message exchanges between n1, n2, n3 and n4, in the next time stamp the node is connected to one or more peers. The peer selection test includes, tracking addition of peers based on the information/message exchanged between the nodes at each time stamp. In an example embodiment, a peer may be added/connected to the one or more nodes n1, n2, n3 and n4, based on information containing coordinates, sequence no., message, IP address etc. In one embodiment, if a peer is intended to be latched on to the peer, in which the peer is maintained to always be connected to another particular peer, then such connection skips the peer selection test and stays connected during all the time of an application. The peer selection test is updated at each time stamp, such that peers are discovered dynamically and continuously. For example, if there are two peers, a selected peer, with who the peer want to keep connected, that is who a node chooses and a recipient peer, who the node sends a message, who the node chooses and who the node is chosen by, then each of the nodes send message and populate the neighbor list and keeps the communication bidirectional. In another example, a peer may be dropped out of the information propagation leading to disconnecting/ disappearance from the mesh network.

In one embodiment, simulation engine 500 includes time sync 506. In general, time sync facilitates managing, securing, planning, and debugging the mesh network topology. For example, time sync 506 determines when a particular event may occur. Also, at a particular event, time may be a frame of reference between all devices on a network. Time as a frame of reference enables synchronizing time between all devices. More particularly with present embodiments, time sync 506 facilitates synchronizing time for each node in a fully connected mesh network. Furthermore, in accordance with the decentralized architecture of present disclosure every node is time synced before a distributed synchronized mechanism.

In one embodiment, simulation engine 500 includes ecosphere 508. For example, in an abstraction layered architecture, ecosphere 508, may be a higher level layer. In a fully connected mesh network, ecosphere 508 tracks events happening around a defined area. For example, in a 3D environment, ecosphere 508 tracks local regions around the sphere to continuously discover a set of neighbor nodes. The set of neighbor nodes may include peers lying on the aforementioned convex hull of inverse spherical transformed coordinates of known peers. More specifically, in a distributed averaging mechanism in accordance with present embodiments, ecosphere 508 facilitates convergence of values to a fully reachable graph and maintains a constant average connection degree amongst peers.

In one embodiment, a simulation model as described in FIG. 5 may be implemented in robots on various applications involving simulation integration, for example, simulation integration between two or more devices such as operating two or more robots. For example, two or more robots with different simulation models, may synchronize for one or more applications. Initially, each of the simulation models may be centered around respective robots. For example, two robots synchronize with each other's simulation (peers), when the ecosphere of the two robots overlaps. The two robots communicate with each other by sending messages. The message may be in the form of a number, depending on an application, the numbers may be parsed and analyzed, and converted back to number format while responding to the message. In one embodiment, UDP (User Datagram Protocol) may be used as a communications protocol to exchange messages between the two robots. Connected robots (here, the robots are peers connected via neighborhood criteria as described in the present disclosure) may observe and filter messages to arrive at a best estimate. For example, a plurality of measurements from the neighbors may be considered as neighbor input and a robot may also have its own measurement input. In this example, measurement may be related to the distance of an object in the vicinity of the two robots. In one embodiment, one or more sensors of the robots may pick up the measurements of distance of the object or robots may pick up the measurements from the neighbor input. Distributed synchronization as described in the present application is applied for arriving at a best estimate of the measurement. In one embodiment, a robot may consider its own input as best input, depending on an application, and may filter the neighbor input and propagate the filtered message as best estimate. In another embodiment, robots may consider the latest updated message as the best estimate and propagate the latest update message. For example, a peer who updated an input message in the most recent timestamp, may be considered as the latest updated message and propagated as the best estimate. In another embodiment, a robot's input message and one or more neighbor robot's input message may be averaged, based on a distributed averaging method, as described, and based on the averaged value, the best estimate is propagated. In another embodiment, a robot may consider the position of a peer nearest to the actual entity (in here, measurement of distance to an object) and based on the position of the peer to the actual entity may consider the best estimate of the measurement and propagate the information. In another embodiment, in accordance with the present disclosure, based on proximity authority, a robot may consider the input from the nearest peer first and then farther peer. Propagation of information is spread radially with one hop by broadcasting and rebroadcasting the best estimate.

Embodiments of the present disclosure provide a method to broadcast, synchronize, and come to a consensus regarding events local to peers and propagates information, than mere propagation of directed message multiple times. Embodiments of the present disclosure provide a method to control flooding of messages during broadcasting of messaging by range and time bounds of the messages. In one embodiment, peers exchange information corresponding to each other and peers' respective neighbor sets, re-compute neighbor sets based on the information corresponding to peers' respective neighbor sets and connect to the newly computed neighbor set and repeat the aforementioned process steps. In one embodiment, if a node disagrees with content of a message being relayed, then the node may refuse to forward or modify the content of a message in agreement to real event before forwarding thereby contributing to global decisions (i.e., decisions affecting the overall mesh topology).

Embodiments of the present disclosure provide a decentralized and scale independent mesh network. For example, the mesh network may not be dependent on distance or density of the mesh topology. In one embodiment, connection between nodes is based on ranking distances than actual value thereby maintaining a constant average connection degree between nodes independent of network size or density. Further, each node in the mesh network is synchronized around a local region. For example, measurement of the distance between the nodes (nodes may be 1 meter away or 1 kilometer away from each other) may not affect configuration of the mesh network topology. In addition, the present mesh network is robust. For example, changes in the density of the mesh network may change the configuration but maintain the connection of nodes in a similar fashion. For example, if 20 nodes are added in the middle of a fully connected network and on an average if each node has four connections, then the configuration of the mesh topology may change but the newly added nodes connect to each other maintaining an average of four connections once the network converges. However the four connections may be closer in proximity. The aforementioned formation of the mesh network topology is self adaptive since the mesh network is built and maintained on proximity criteria as to how quick communication between two nodes is propagated. For example, an addition or dropping of a node still allows network topology to adapt quickly with the nearest neighbor node.

In an alternative embodiment, a node may be connected only to next node forming a zig zag configuration. For example, in FIG. 3, node n1 is connected to node n2, node n2 to n3, node n4 to node n5 and node n5 to n6 and so on and so forth.

Figure 6:
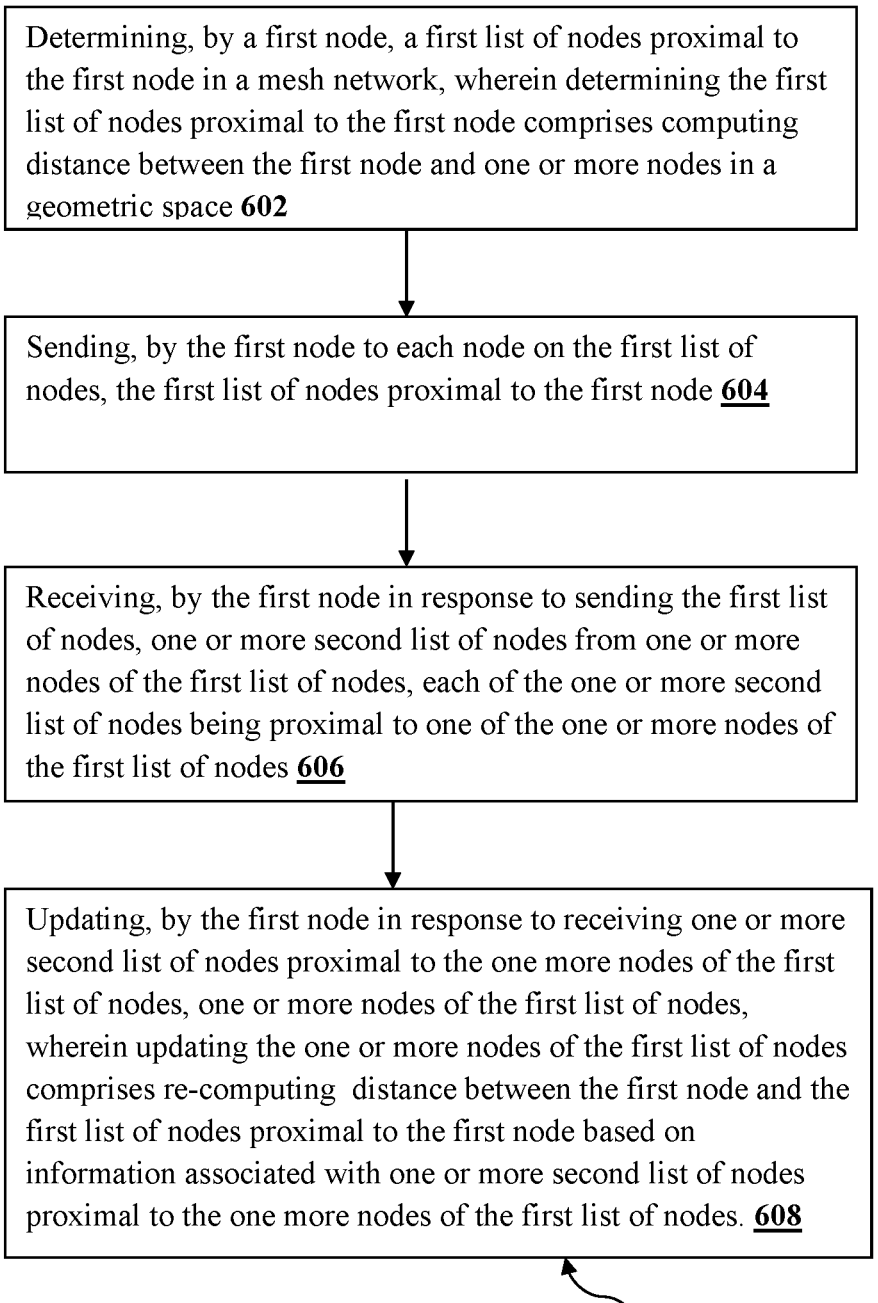
FIG. 6 is a flow diagram illustrating a method for geographic routing mesh network, in accordance with some embodiments of the present disclosure.

FIG. 6, illustrates a flow-diagram of a method 600 for geographic routing mesh network, in accordance to some embodiments of present disclosure. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communication network. The order in which the method 600 is described is not intended to be construed as a limitation, and any number of the described method blocks can be combined in any order to implement the method 600, or an alternative method. Furthermore, the method 600 can be implemented in any suitable hardware, software, firmware, or combination thereof. In an embodiment, the method 600 depicted in the flow chart may be executed by a system, for example, the system 100 of FIG. 1. The method 600 of FIG. 6 will be explained in more detail below with reference to FIGS. 1-5.

Referring to FIG. 6, in the illustrated embodiment, the method 600 is initiated at 602 where the method includes determining, by a first node, a first list of nodes proximal to the first node in a mesh network. For example, as shown in FIG. 3 the node n1 is the first node known by each of the nodes in a geographic space. In one embodiment, a mesh network is formed by iteratively computing nearest node/neighbor node/proximal node at each time stamp based on neighbor criterion. Node n1 determines the first list of nodes proximal to the node n1 based on the neighbor criterion. The first list of nodes proximal to the first node n1 are nodes n2, n3, n5 and n6 (as shown in FIG. 2). In this time stamp, node n1 determines the first list of proximal nodes n2, n3, n5 and n6 as nearest nodes. Each of nodes n1, n2, n3, n5 and n6 is contacted by node n1 or forms direct communication with n1. In one embodiment of determining the neighbor criterion, the first node computes distance between the first node and one or more nodes in the neighborhood of the first node in the geometric space. The computed distance for each of the one or more nodes is transformed to reciprocal by applying inversion spherical transformation, whereby the computed distance is converted to new reciprocal values, and based on the new reciprocal values a convex hull is built. In the convex hull, the new reciprocal values are selected to form a smallest convex polygon enclosing a sphere around the first node, and one or more nodes lying on the sphere is determined as proximal node, for example, as first list of nodes proximal to first node.

At 604, the method includes sending, by the first node to each node on the first list of nodes, the first list of nodes proximal to the first node. In this time stamp, the first list of nodes n1, n2, n5 and n6 proximal to the first node n1 are determined and contacted by n1 (as shown in FIG. 2). The node n1 also contacts other remaining nodes, namely, nodes n3, n4, n7 . . . n16 with the first list of nodes, since each of these nodes initially contacted node n1. In this time stamp, each of the nodes n1, n2, n3, n4 . . . n16 contain information related to the first list of nodes proximal to the first node n1. In addition to node n1, nodes n2, n3, n4 . . . n14 has knowledge corresponding to the first list of proximal nodes n1, n2, n5 and n6. In an example embodiment, in the next time stamp, nodes n4, n7, n8 . . . n16 determine and contact list of neighbors nodes proximal to nodes n3, n4, n7 . . . n16. In the next time stamp, nodes n2, n5 and n6 determine and contact list of neighboring nodes proximal to nodes n2, n3, n5 and n6.

At 606, the method includes receiving, by the first node in response to sending the first list of nodes, one or more second list of nodes from one or more nodes of the first list of nodes, each of the one or more second list of nodes being proximal to one of the one or more nodes of the first list of nodes. Nodes n3, n2, n5 and n6 receive a list of neighbor nodes proximal to node n1. In next time stamp, one or more nodes from n3, n2, n5 and n6 determines one or more second list of nodes proximal to the one or more nodes of the first list of nodes, that is proximal to one or more nodes from n2, n3, n5 and n6. In one embodiment, each of the first list of nodes may determine and generate a second list of nodes, that is each of nodes n1, n2, n5 and n6 may determine and generate a second list of nodes and contact every node that connected in previous time stamp. In another embodiment, one or more of the first list of nodes may determine and generate a second list of nodes, that is only n2 and n3 may determine and generate a second list of nodes and contact every node that connected in previous time stamp. Based on the proximity matrix generated by each node, depending on the predetermined application, one or more second lists of nodes may be generated. For example, since the nodes (as shown in FIG. 3) are dynamic in nature, there may be an addition of a node or a node may disappear depending on a particular application or services. Further, based on predetermined application, mesh topology may adapt to particular application and determine churn rate of addition and deletion of a node in the mesh network topology.

At 608, the method includes updating, by the first node in response to receiving one or more second list of nodes proximal to the one more node of the first list of nodes, one or more nodes of the first list of nodes. The one or more nodes of the first list of nodes is updated by re-computing distance between the first node and the first list of nodes proximal to the first node based on information associated with one or more second list of nodes proximal to the one more nodes of the first list of nodes. Embodiments of the present disclosure provide a method of forming a mesh network by successive iteration of determining the closest neighbor nodes and contacting the determined closest neighbor nodes with knowledge containing a list of closest neighbors nodes. In the previous time stamp, node n1 receives one or more second list of nodes proximal to the one or more nodes of the first list of nodes. In successive time stamps, node n1 with knowledge on one or more second list of nodes, re-computes the determined first list of nodes proximal to n1. In successive time stamps, the one or more second list of nodes proximal to the one or more nodes of the first list of nodes is updated. The first list of nodes re-computes distance between first node and first list of nodes proximal to first node based on information associated with one or more second list of nodes proximal to the one or more nodes of the first list of nodes. Therefore, embodiments of present disclosure provide a dynamic and continuous process of computing and re-computing lists of neighbor nodes to form a fully connected mesh network. The fully connected mesh network is further maintained by continuous propagation of information related to neighbor list dynamically changing the connection between the nodes until each of the nodes achieves a best estimate of neighbor list by distributed authority.

In one embodiment, present disclosure provides a distributed authority for maintaining the mesh network. In the distributed authority, connected nodes (for example connected nodes of FIG. 3) in the mesh network have control over message filtering (filtering messages from neighbor nodes) and forwarding (broadcasting the filtered messages). Process of distributed authority (also known as distributed synchronization) includes determining a value associated with each of the updated one or more nodes of the first list of nodes, of FIG. 3, in the mesh network. The value associated with each of the updated one or more nodes may be information corresponding to a node, for example, time clock, position of an object, location of coordinates, distance between nodes etc. In one embodiment, each updated one or more nodes of the first list of nodes include a value corresponding to the time clock of said nodes. In every iterative cycle of the fully connected mesh network, each of the updated one or more nodes averages values corresponding to the time clock in reference to neighbor nodes or peers. The iterative cycle is repeated until best estimate of the time clock is achieved, i.e., arriving at a single value agreed upon by peers. After every iterative cycle, each node broadcasts and re-broadcasts the average value to neighbor nodes thereby arriving at a convergence in the value. The process of distributed synchronization progresses from microscopic, that is, considering values from the nearest neighbor first to macroscopic, considering values from the farthest neighbor to arrive at a best estimated single value or a value that is agreed upon by nodes. The determined single value is broadcasted and applied across the mesh network. In one embodiment, depending on an application, either only one node computes a value and broadcasts, or all local neighbors compute the value and vote for the best estimate.

In one embodiment, the present disclosure also provides selecting a value based on proximity of each of the updated one or more nodes of the first list of nodes, if each of the one or more nodes of the first list of nodes is associated with conflicting values. For example, if conflicting updates are received from multiple neighbor nodes simultaneously, the local node decides and arbitrates based on user customizable logic/application, and the resulting best estimate is forwarded to remaining neighbors to continue the propagation and iterative refinement process. In other words, in iterative refinement process updates are ignored (filtered) unless it comes from the neighbor closest in proximity to the origin of the update message. Embodiments of the present distributed authority follows a proximity authority in the absence of central authority.

In one embodiment, a node may get deleted or disappear from the list of nodes proximal to one of the one or more nodes of the first list of nodes in the mesh network. Based on the deleted node the new list of nodes proximal to one of the one or more nodes of the first list of nodes is updated. For example, a node may be not responsive for a long period of time, such nodes may get deleted from the list of neighbors. In another example, the node may not be updated for a longer period of time and such stale nodes may disappear from the mesh network. In another example, the information associated with a node may not be relevant to the neighbors node, hence the nodes no longer continue communication/connection with non-relevant nodes. Relevancy and non-relevancy of information/message may be based on an application or service.

In various embodiments of FIGS. 1-6, a method and system for geographic routing mesh network is disclosed. The present disclosures solves technical problems in the field related to the need for low latency, infrastructure-free, and massively scalable communication and synchronization between nodes embedded in geometric space. Embodiments of the present architecture provide minimal communication latency between peers of neighboring proximity, since the mesh topology maintains direct connections to nearest proximity peers. The direct connection to nearest proximity peers is useful in many physical situations, where systems must respond to nearby events immediately whereas remote events can wait. Additionally, the present architecture is scalable to an infinite number of nodes, since there is a constant average connection degree between nodes independent of network size or density, since every node is synchronizing around a local region. Further, peer to peer communication is symmetrical in function and does not include a central coordinating infrastructure. Embodiments of the present architecture provide a high degree of failure redundancy, due to infrastructure free/decentralized architecture, the mesh network stays intact and self-heals as long as there remains a single connection between otherwise disconnected groups of nodes. In addition, decentralized architecture facilitates efficient neighbor search, since all nodes are directly connected to neighbors and accelerate large processes and computations that rely on neighbor search frequently. For example, in a large particle swarm simulation or optimization, where the motion of each particle is influenced primarily by its neighbors without compartmentalizing spatial regions provides best data structures, unlike algorithms that may be achieved by log linear runtime.

In addition to above advantages, distributed authority/synchronization of present disclosure allows distribution of work and computation over geometric spaces. In real world application, it is useful to parallelize the simulation of an infinitely large virtual world while avoiding latency of central computing bottleneck at scale.

The foregoing diagrams represent logical architectures for describing processes according to some embodiments, and actual implementations may include one or more components arranged in other manners. Other topologies may be used in conjunction with other embodiments. Moreover, each component or device described herein may be implemented by any number of devices in communication via any number of other public and/or private networks. Two or more of such computing devices may be located remotely from one another and may communicate with one another via any known manner of protocol(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code read from one or more of non-transitory computer-readable media, such as a floppy disk, a CD-ROM, a DVD-ROM, a Flash drive, a magnetic tape, and solid state Random Access Memory (RAM) or Read Only Memory (ROM) storage units and then stored in a compressed, non-compiled and/or encrypted format. In some embodiments, hard-wired circuitry may be used in place of, or in combination with, program code for implementation of processes according to some embodiments. Embodiments are therefore not limited to any specific combination of hardware and software.

In an implementation, one or more of the method(s) described herein may be implemented at least in part as instructions embodied in a non-transitory computer-readable medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

It is intended that the disclosure and examples be considered as exemplary only, Those in the art will recognize other embodiments may be practiced with modifications and alterations to that described above.

What is claimed is:

1. A processor-implemented method comprising:
   determining, by a first node, a first list of nodes proximal to the first node in a mesh network, wherein determining the first list of nodes proximal to the first node comprises computing distance between the first node and one or more nodes in a geometric space;
   sending, by the first node to each node on the first list of nodes, the first list of nodes proximal to the first node;
   receiving, by the first node in response to sending the first list of nodes, one or more second list of nodes from one or more nodes of the first list of nodes, each of the one or more second list of nodes being proximal to one of the one or more nodes of the first list of nodes; and
   updating, by the first node in response to receiving one or more second list of nodes proximal to the one more nodes of the first list of nodes, one or more nodes of the first list of nodes, wherein updating the one or more nodes of the first list of nodes comprises re-computing distance between the first node and the first list of nodes proximal to the first node based on information associated with one or more second list of nodes proximal to the one more nodes of the first list of nodes;
   determining, by the first node, a value associated with each of the updated one or more nodes of the first list of nodes in the mesh network;
   communicating, by the first node, information corresponding to the determined value associated with each of the updated one or more nodes of the first list of nodes to the first node; and
   computing, by the first node, an average of the determined value based on the communicated information, wherein the average of the determined value is applied across the mesh network.

2. The method of claim 1, further comprising:
   sending, by the first node to each node on the updated first list of nodes proximal to the first node, the updated first list of nodes proximal to the first node.

3. The method of claim 1, wherein computing the distance between the first node and the one or more nodes in the geometric space comprises:
   performing an inversion of sphere on each of the computed distance between the first node and the one or more nodes;
   forming a convex hull based on the inversion of sphere on each of the computed distance; and
   determining the first list of nodes proximal to the first node within the convex hull.

4. The method of claim 1, wherein proximity of the first list of nodes proximal to the first node is defined by coordinates of each of the first list of nodes in the geometric space.

5. The method of claim 1, further comprising:
selecting a value based on proximity of each of the updated one or more nodes of the first list of nodes, if the one or more nodes of the first list of nodes is associated with conflicting values; and
communicating information corresponding to the selected value based on proximity of each of the updated one or more nodes of the first list of nodes to the first node.

6. The method of claim 5, further comprising:
predetermining an attribute associated with each of the updated one or more nodes of the first list of nodes, if the one or more nodes of the first list of nodes is associated with conflicting values.

7. The method of claim 1, wherein computing the average of the determined value is based on degree of proximity of the first node with each of the updated one or more nodes of the first list of nodes.

8. The method of claim 7, wherein the degree of proximity of the first node with each of the updated one or more nodes of the first list is based on neighborhood of the first node defined by geometric space of the mesh network.

9. The method of claim 1, further comprising
adding a new node or deleting a node in the mesh network, wherein the new node receives a list nodes proximal to the new node; and
updating the list of nodes proximal to the new node based on the received list of new nodes proximal to the new node.

10. The method of claim 1, wherein the determined value associated with each of the updated one or more nodes comprise information corresponding to a node.

11. A system comprising:
a memory storing instructions;
a processor coupled to the memory, wherein the processor is configured by the instructions to:
determine, by a first node, a first list of nodes proximal to the first node in a mesh network, wherein determining the first list of nodes proximal to the first node comprises computing distance between the first node and one or more nodes in a geometric space;
send, by the first node to each node on the first list of nodes, the first list of nodes proximal to the first node;
receive, by the first node in response to sending the first list of nodes, one or more second list of nodes from one or more nodes of the first list of nodes, each of the one or more second list of nodes being proximal to one of the one or more nodes of the first list of nodes; and
update, by the first node in response to receiving one or more second list of nodes proximal to the one more nodes of the first list of nodes, one or more nodes of the first list of nodes, wherein updating the one or more nodes of the first list of nodes comprises re-computing distance between the first node and the first list of nodes proximal to the first node based on information associated with one or more second list of nodes proximal to the one more nodes of the first list of nodes;
determining, by the first node, a value associated with each of the updated one or more nodes of the first list of nodes in the mesh network;
communicating, by the first node, information corresponding to the determined value associated with each of the updated one or more nodes of the first list of nodes to the first node; and
computing, by the first node, an average of the determined value based on the communicated information, wherein the average of the determined value is applied across the mesh network.

12. The system of claim 11, further configured to:
send, by the first node to each node on the updated first list of nodes proximal to the first node, the updated first list of nodes proximal to the first node.

13. The system of claim 11, further configured to:
perform an inversion of sphere on each of the computed distance between the first node and the one or more nodes;
form a convex hull based on the inversion of sphere on each of the computed distance; and
determine the first list of nodes proximal to the first node within the convex hull.

14. The system of claim 11, wherein proximity of the first list of nodes proximal to the first node is defined by coordinates of each of the first list of nodes in the geometric space.

15. The system of claim 11, further configured to:
select a value based on proximity of each of the updated one or more nodes of the first list of nodes, if the one or more nodes of the first list of nodes is associated with conflicting values; and
communicate information corresponding to the value based on proximity to the updated one or more nodes of the first list of nodes to the first node.

16. The system of claim 15, further configured to:
predetermine an attribute associated with each of the updated one or more nodes of the first list of nodes, if one or more nodes of the first list of nodes is associated with conflicting values.

17. The system of claim 11, wherein computing the average of the determined value is based on degree of proximity of the first node with each of the updated one or more nodes of the first list of nodes.

18. The system of claim 11, further configured to:
add a new node or delete a node to the mesh network, wherein the new node receives a list nodes proximal to the new node; and
update the list of nodes proximal to the new node based on the received list of new nodes proximal to the new node.

19. The system of claim 11, wherein the determined value associated with each of the updated one or more nodes comprise information corresponding to a node.

20. A non-transitory computer-readable medium having embodied thereon a computer program, the method comprising:
determining, by a first node, a first list of nodes proximal to the first node in a mesh network, wherein determining the first list of nodes proximal to the first node comprises computing distance between the first node and one or more nodes in a geometric space;
sending, by the first node to each node on the first list of nodes, the first list of nodes proximal to the first node;
receiving, by the first node in response to sending the first list of nodes, one or more second list of nodes from one or more nodes of the first list of nodes, each of the one or more second list of nodes being proximal to one of the one or more nodes of the first list of nodes; and updating, by the first node in response to receiving one or more second list of nodes proximal to the one more nodes of the first list of nodes, one or more nodes of the first list of nodes, wherein updating the one or more nodes of the first list of nodes comprises re-computing distance between the first node and the first list of nodes proximal to the first node based on information associated with one or more second list of nodes proximal to the one more nodes of the first list of nodes;

determining, by the first node, a value associated with each of the updated one or more nodes of the first list of nodes in the mesh network;

communicating, by the first node, information corresponding to the determined value associated with each of the updated one or more nodes of the first list of nodes to the first node; and computing, by the first node, an average of the determined value based on the communicated information, wherein the average of the determined value is applied across the mesh network.

* * * * *